United States Patent
Crow et al.

(10) Patent No.: US 10,130,035 B2
(45) Date of Patent: Nov. 20, 2018

(54) ROW UNIT FOR A CORN HEAD ASSEMBLY HAVING A TOP PLATE WITH A STRUCTURED SURFACE

(71) Applicant: CNH Industrial America LLC, New Holland, PA (US)

(72) Inventors: Brian Patrick Crow, Rock Island, IL (US); Eric L. Walker, Narvon, PA (US); James Michael Gessel, Geneseo, IL (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 41 days.

(21) Appl. No.: 14/937,132

(22) Filed: Nov. 10, 2015

(65) Prior Publication Data
US 2017/0127615 A1    May 11, 2017

(51) Int. Cl.
*A01D 57/22*    (2006.01)
*A01D 45/02*    (2006.01)
*A01D 101/00*   (2006.01)

(52) U.S. Cl.
CPC ........... *A01D 57/22* (2013.01); *A01D 45/023* (2013.01); *A01D 2101/00* (2013.01)

(58) Field of Classification Search
CPC ...... A01D 47/00; A01D 45/02; A01D 45/021; A01D 45/023; A01D 45/025; A01D 41/06; A01D 2101/00; A01D 57/22
See application file for complete search history.

(56) References Cited

U.S. PATENT DOCUMENTS

| | | | |
|---|---|---|---|
| 823,880 A | 6/1906 | Koch | |
| 987,378 A | 3/1911 | King | |
| 3,759,021 A | 9/1973 | Schreiner et al. | |
| 3,808,783 A * | 5/1974 | Sutherland | A01D 45/021 171/61 |
| 4,300,335 A | 11/1981 | Anderson | |
| 5,195,309 A | 3/1993 | Mossman | |
| 5,878,561 A * | 3/1999 | Gunn | A01D 45/023 56/119 |
| 5,881,541 A * | 3/1999 | Silver | A01D 45/023 56/119 |
| 6,237,312 B1 * | 5/2001 | Becker | A01D 45/021 56/119 |
| 7,373,767 B2 | 5/2008 | Calmer | |
| 7,874,134 B1 | 1/2011 | Hoffman | |
| 7,913,480 B2 * | 3/2011 | Christensen | A01D 45/021 56/119 |
| 8,220,235 B2 * | 7/2012 | Kowalchuk | A01D 45/021 56/62 |

(Continued)

FOREIGN PATENT DOCUMENTS

WO    2016106366    6/2016

*Primary Examiner* — Alicia Torres
*Assistant Examiner* — Adam J Behrens
(74) *Attorney, Agent, or Firm* — Peter K. Zacharias; Patrick M. Sheldrake

(57) ABSTRACT

A row unit of a corn head assembly for an agricultural harvester capable of reducing grain loss is provided. The row unit includes a frame and first and second spaced apart row unit arms mounted to the frame, and a top plate. The top plate is positioned about a rear end of the frame and includes an outer surface having a retaining structure configured to inhibit a flow of grain in a forward direction along the outer surface.

9 Claims, 7 Drawing Sheets

(56) References Cited

U.S. PATENT DOCUMENTS

| | | | |
|---|---|---|---|
| 8,820,039 B2* | 9/2014 | Werning | A01D 41/1273 |
| | | | 460/5 |
| 8,863,487 B2* | 10/2014 | Calmer | A01D 45/021 |
| | | | 56/106 |
| 9,179,601 B2* | 11/2015 | Walker | A01D 45/021 |
| 9,668,413 B2* | 6/2017 | Walker | A01D 45/021 |
| 2014/0237975 A1* | 8/2014 | Walker | A01D 45/021 |
| | | | 56/113 |
| 2014/0298769 A1 | 10/2014 | Walker | |
| 2015/0000239 A1* | 1/2015 | Calmer | A01D 45/021 |
| | | | 56/119 |

\* cited by examiner

ROW UNIT FOR A CORN HEAD ASSEMBLY HAVING A TOP PLATE WITH A STRUCTURED SURFACE

BACKGROUND OF THE INVENTION

The present invention relates generally to corn head assemblies for use with combine harvesters. In particular, the present invention relates to an improved corn head assembly having a row unit that includes a structured surface to inhibit the loss of grain during harvesting operations.

An agricultural combine is a machine used to harvest a variety of crops from a field. During a harvesting operation, a corn head assembly or corn header at the front of the combine cuts ripened crop from the field. A feederhouse connected to the corn head assembly transfers the crop material into the combine. Threshing and separating assemblies within the combine remove grain from the crop material and transfers the clean grain to a grain tank for temporary holding. Crop material other than grain (MOG) exits from the rear of the combine. An unloading auger transfers the clean grain from the grain tank to a truck or grain cart for transport, or to another receiving bin on or off machine for holding.

Combines that harvest corn are provided with a corn header that includes row units for harvesting and separating ears of corn from corn stalk. Such row units include a top plate or back plate having a smooth top surface which allow harvested corn to slide rearward to the corn head assembly's auger. These smooth areas, however, also allow for harvested corn and its associated grain to slide away from the auger when insufficient crop material is processed through the corn head assembly, such as when the combine passes through an area of poor crop density or an end of a harvesting row. As such, this leads to a loss of harvested crop material and ultimately an economic loss.

Thus, there is still a need for a combine harvester that is capable of preventing crop loss at the corn head assembly location and which addresses the aforementioned drawbacks of conventional corn head assemblies. Such a need is satisfied by the row unit of a corn head assembly for a combine harvester of the present invention.

BRIEF SUMMARY OF THE INVENTION

In accordance with the present invention, the loss of grain during harvesting operations is solved or reduced by engendering a retaining feature on a portion of a row unit, e.g., a row unit top plate. In this way, grain dislodged from ears of corn and deposited on the row unit is prevented or at least retarded in its speed of travel from falling to the ground until a flow of harvesting material can propel the grain rearwardly into the downstream components of the corn header.

In accordance with a preferred embodiment, the present invention provides a row unit of a corn head assembly. The row unit includes a frame, first and second spaced apart row unit arms mounted to the frame, and a top plate. Each row unit arm includes a forward end and a rear end. The top plate is positioned about a rear end of the frame. The top plate includes an outer surface having a structure configured to inhibit a flow of grain in a forward direction along the outer surface.

In accordance with another preferred embodiment, the present invention provides a top plate of a row unit of a corn head assembly for a combine harvester. The top plate includes a top surface, a rear end and a forward end. The top plate also includes a first aperture for mounting a sprocket of a gathering chain assembly therethrough and an elongated structure extending along the top surface configured to inhibit a flow of grain in a forward direction along the top surface.

In accordance with an aspect, the present invention provides a top plate having a built in stamped feature to help with kernel/grain losses. The built in feature can be a step feature on the plate that fills in gaps around an idler sprocket/gathering chain to the top surface. Additionally, the step feature will help retain or slow kernels from falling back forward during operation.

Current gaps in the row unit allow for the potential for increased losses of grain during header operation. To address this issue, the present invention provides a feature, stamped in as a step in the top plate in order to fill in these gaps on the sides as well as create a ledge to retain or slow down the loss of grain when operating in the harvest position.

The built in feature on the top plate helps reduce kernel losses during operation by filling in gaps as well as to slow or retain such kernels during operation. Standard row units are positioned to operate at angle of about 21 degrees relative to a horizontal ground surface, as such, a ledge at the front of the feature will assist in slowing kernels that happen to be deposited on the top plate and move forwardly. The wrapping nature of the feature on the sides of the top plate helps to keep the kernels in the ear channel and from being lost under the chains. The feature can be constructed as a single piece design, which also reduces cost of manufacture and improves reliability.

The feature can be welded in steps or ribs instead of a one piece construction. Additionally, the retaining feature could be changed to include multiple retaining ribs covering the entire top plate instead of just the front ledge.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Reference will now be made in detail to the preferred embodiments of the invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, and ±0.1% from the specified value, as such variations are appropriate.

The terms "grain," "tailing," and "crop material" are used throughout the specification for convenience and it should be understood that these terms are not intended to be limiting. Thus, "grain" refers to that part of a crop which is harvested and separated from discardable portions of the crop material.

Figure 1:
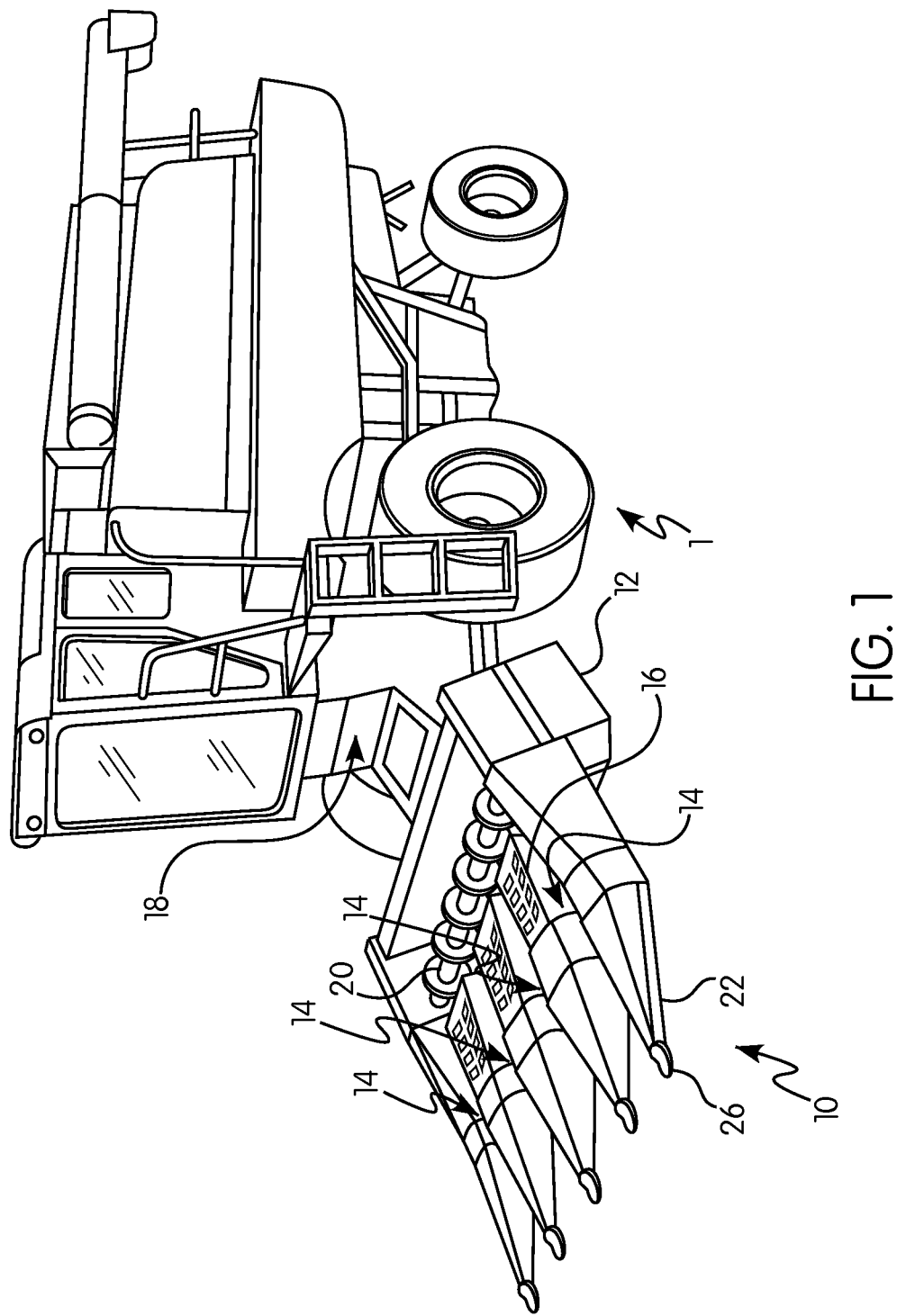
FIG. 1 is a perspective view of an agricultural combine having a row unit of a corn head assembly according to a preferred embodiment of the present invention.

Referring now to the drawings, wherein preferred embodiments of the present invention are shown, FIG. 1 illustrates a corn head assembly 10 of the present invention as applied to an agricultural combine or combine harvester 1. The corn head assembly 10 is shown to be operatively connected to the combine harvester 1 for harvesting corn and feeding the corn to a feederhouse 18. Such feederhouses and harvesting operations of the combine harvester are known in the art and a further detailed description of their structure, function and operation is not necessary for a complete understanding of the present invention. However, typical corn head assemblies applicable to the present invention are disclosed in U.S. Pat. Nos. 3,808,783 and 3,759,021, the entire disclosures of which are incorporated by reference herein. A variety of row dividers also applicable to the present invention are disclosed in U.S. Pat. No. 5,195,309, the entire disclosure of which is incorporated by reference herein.

The corn head assembly 10 includes a header frame 12 for mounting to a forward end of the combine harvester 1, a plurality of row units 14 extending forward from the header frame 12 and a hood 16 extending between an adjacent pair of row units 14. The plurality of row units 14 are each preferably configured as shown. Such row units 14 are known in the art and a further detailed description of their structure, function and operation is not necessary for a complete understanding of the present invention. However, typical row units applicable to the present invention are disclosed in U.S. Pat. Nos. 7,913,480, 7,874,134 and 7,373,767, the entire disclosures of which are incorporated by reference herein. The hood 16 is generally configured as a convex shaped hood that extends between an adjacent pair of row units 14 to cover the space between said pair of row units 14 (FIG. 2) so as to prevent the loss of grain from falling to the ground during harvesting operations.

The combine harvester 1 includes a conveyor 20. The conveyor 20 conveys grain separated from the stalk by the row units 14 to the feederhouse 18 once the grain is received within a channel of the conveyor 20. The conveyor 20 is connected to the header frame 12 about its side walls and is situated within the channel extending between the side walls of the header frame 12. As such, grain received within the channel is conveyed towards the feederhouse 18 by the conveyor 20. The conveyor 20 is positioned in front or above a combine feeding location and rearward of the row dividers 22 and hood 16.

Figure 2:
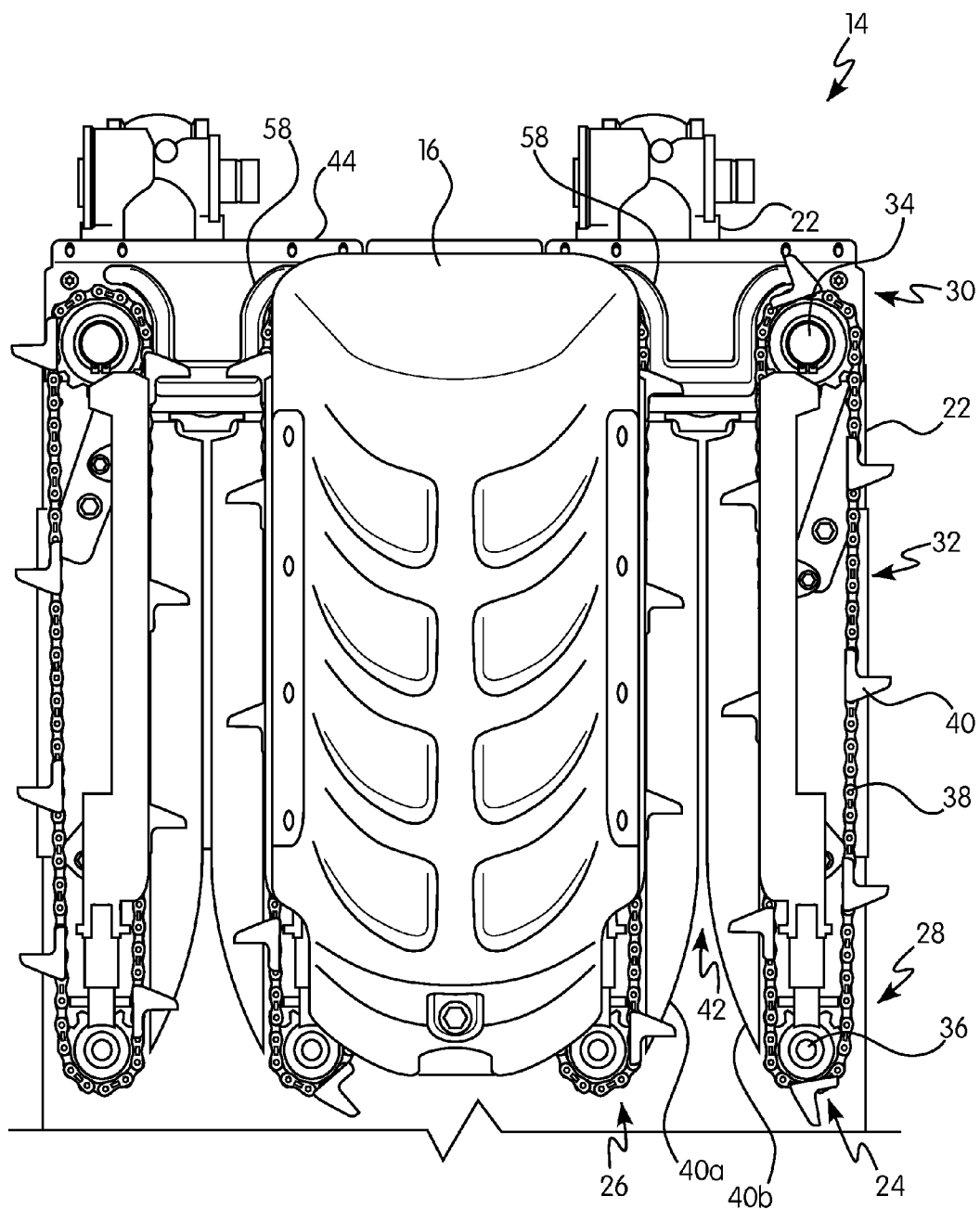
FIG. 2 is a top plan view of a pair of row units having a hood in accordance with a preferred embodiment of the present invention.
Figure 3:
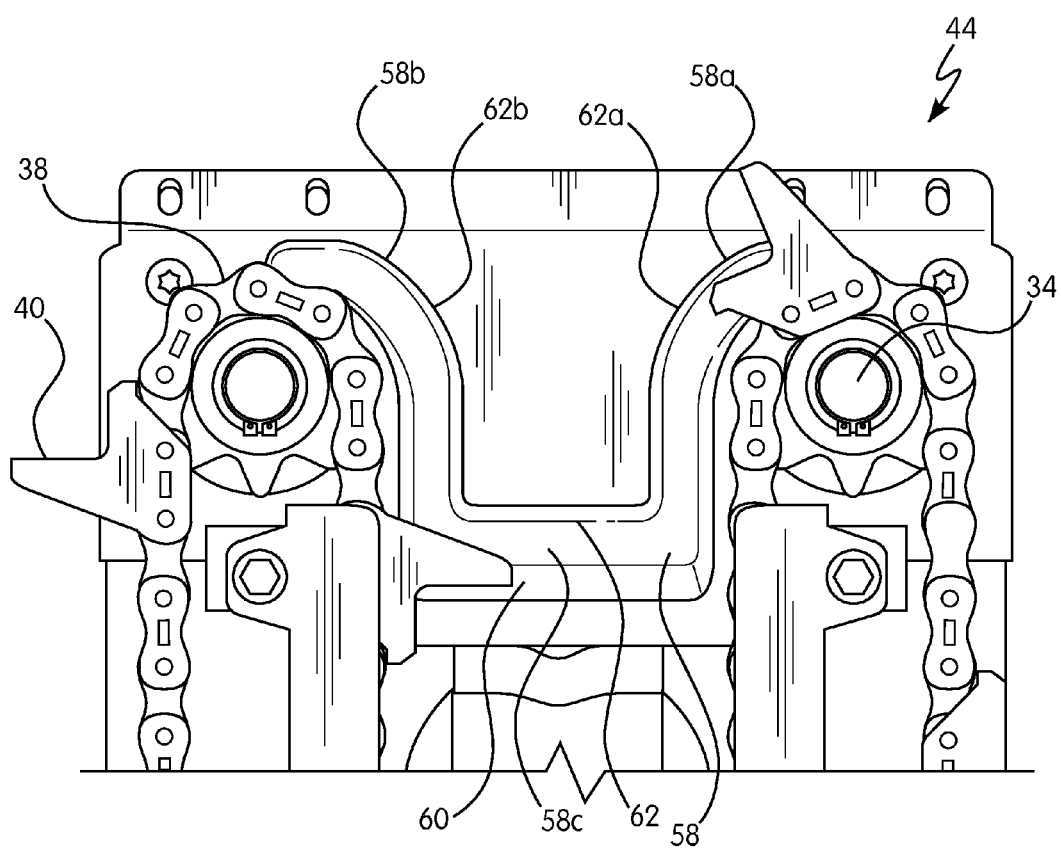
FIG. 3 is an enlarged partial top perspective view of the row unit of FIG. 2.
Figure 4:
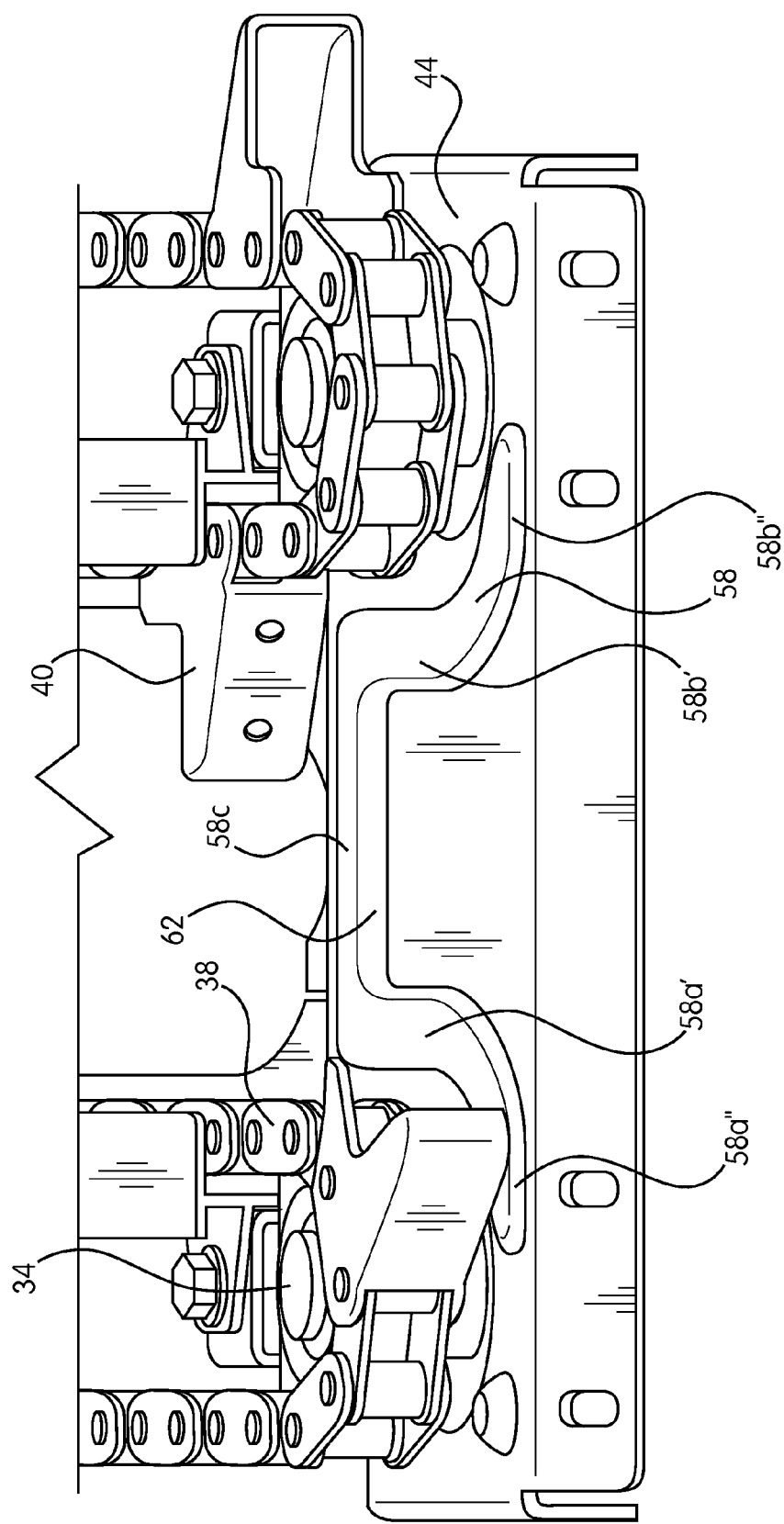
FIG. 4 is an enlarged partial rear perspective view of the row unit of FIG. 2.

In accordance with a preferred embodiment, the present invention provides a row unit 14 of a corn head assembly or corn header 10, as best shown in FIGS. 2-4. The row unit includes a frame 22 and first and second spaced apart row unit arms 24, 26. The frame 22 is of general construction known in the art having a forward portion and a rear portion attachable to the header frame 12.

Each row unit arm is mounted to the frame 22 and includes a forward end 28 and a rear end 30. The rear end 30 of the row unit arms are proximate the combine while the forward end 28 is distal to the combine.

As best shown in FIG. 2, the first row unit arm 24 includes a gathering chain assembly 32. The gathering chain assembly 32 includes a drive sprocket 34 about the rear end of the row unit arm and a driven sprocket 36 about the forward end of the row unit arm. An endless chain 38 extends between the drive sprocket and driven sprocket. The endless chain 38 includes a plurality of paddles 44 facilitating the movement of corn stalk through the row unit. The second row unit arm 26 is similarly configured as the first row unit arm but in a mirrored configuration.

The row unit 14 is attached to the header frame 12 and extends in a forward direction from the header frame 12 and away from the combine harvester 1. Each row unit 14 includes a pair of spaced apart deck plates 40a, 40b (also commonly known as stripping plates) mounted to the row unit frame 22. Each stripping plate has a length that extends in a forwardly direction from the header frame 12 and extends a length up to a forward end of the hood 16. In operation, crop material is stripped from the stalks as they are pulled within the row unit 14 and enter a gap 42 formed by the deck plates 40a, 40b. The stripped grain is then conveyed to the conveyor 20 owing to the flow of crop material in a rearward direction during harvesting operation. That is, the subsequent flow of crop material entering the row units 14 pushes/pulls the harvested crop material rearward towards the conveyor 20.

Figure 5:
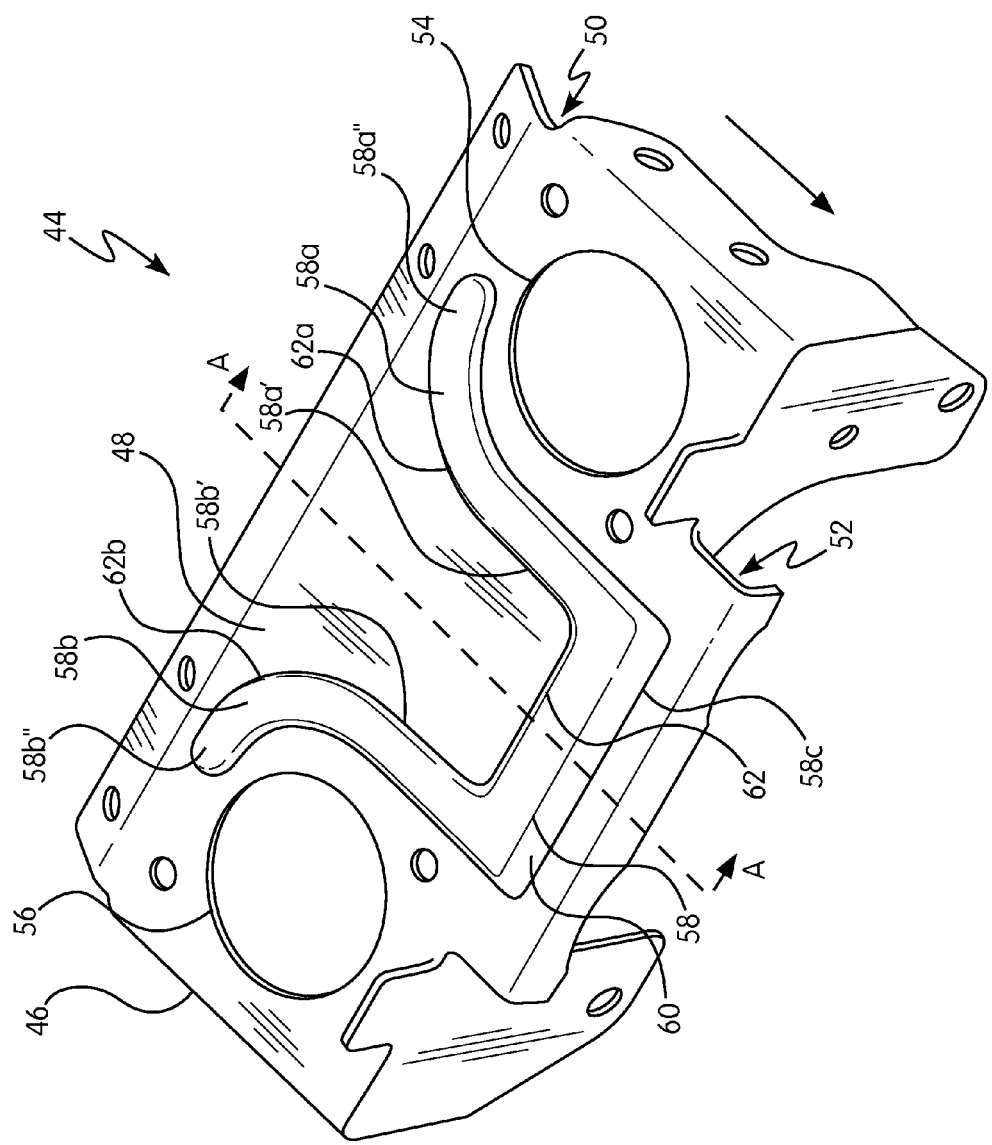
FIG. 5 is an enlarged perspective view of a top plate of the row unit of FIG. 2.

The row unit 14 also includes a top plate 44. The top plate 44 is configured as best shown in FIG. 5 and is positioned about the rear end of the frame 22. The top plate includes a main portion 46 having a top surface 48, a rear end 50, and a forward end 52. The forward end 52 is preferably linear. The main portion 46 is a substantially planar member having a width sufficient to extend across the rear ends of the first and second row unit arms.

As shown in FIG. 2, the top plate extends across the rear end of the first and second row unit arms. The top plate 44 is also positioned on the row unit such that forward end 52 is adjacent a most posterior end of the deck plates 40a, 40b.

The top plate 44 includes a first aperture 54 and a second aperture 56 spaced from the first aperture. The first aperture 54 is positioned spaced from a midline of the top plate and about a lateral side portion of the top plate, whereas the second aperture is positioned spaced from the midline and about an opposite lateral side portion of the top plate. Preferably, the first aperture is a circular through hole sized and configured to receive the drive sprocket 34 of the first row unit arm therethrough, and second aperture is a circular through hole sized and configured to receive the drive sprocket 34 of the second row unit arm therethrough.

The top plate 44 also includes a structure 58 configured to inhibit a flow of grain in a forward direction along the outer surface or top surface 48. The structure 58 is preferably an elongated structure, and more preferably configured as at least one of a corrugation, a rib, a protrusion, a retaining wall and the like. In accordance with an aspect of the present embodiment, the structure 58 is unitarily formed on the top plate. Alternatively, the structure e.g., an elongated structure, can be a separately fabricated component that is mounted to the top plate e.g., by a fastener, welding, or the like. Further, the structure or kernel saving feature can alternatively be welded or otherwise attached to the top plate as a step feature.

The structure 58, is preferably configured as shown best in FIG. 5, having a first portion 58a, a second portion 58b, and a third portion 58c. The first portion 58a is a curved portion, the second portion 58b is a curved portion, and the third portion 58c is a linear portion. The third portion 58c is a forward portion preferably positioned adjacent the forward end 52 so as to extend along and substantially parallel with the forward end of the top plate. The first and second portions are rearwardly extending portions extending from the forward portion. Each of the first, second and third portions can be of unitary construction or segmented from each other. Preferably, the first, second and third portions are of unitary construction and form any elongated structure that is substantially U-shaped.

In accordance with an aspect of the present embodiment, the first portion 58a includes a linear portion 58a' and a curved portion 58a", and the second portion 58b includes a linear portion 58b' and a curved portion 58b". The linear portion 58a' extends rearwardly from the third portion 58c to about a position defined by an axis extending along a longitudinal direction of the top plate and intersecting the centers of the first and second apertures 54, 56. The curved portion 58a" extends from the end of the linear portion 58a' and follows a curve circumscribing the first aperture 54. Consequently, the curved portion 58a" curves or extends along a path adjacent to a travel path of the endless chain 38 about the drive sprocket 34. Preferably, the curved portion 58a" terminates about a most posterior end of the aperture 54. That is, the curved portion 58a" preferably extends an arc length of about ninety degrees.

Likewise, the linear portion 58b' and curved portion 58b" of the second portion 58b is similarly configured as the first portion 58a, but in a mirrored fashion and in connection with the second aperture 56.

Figure 5A:
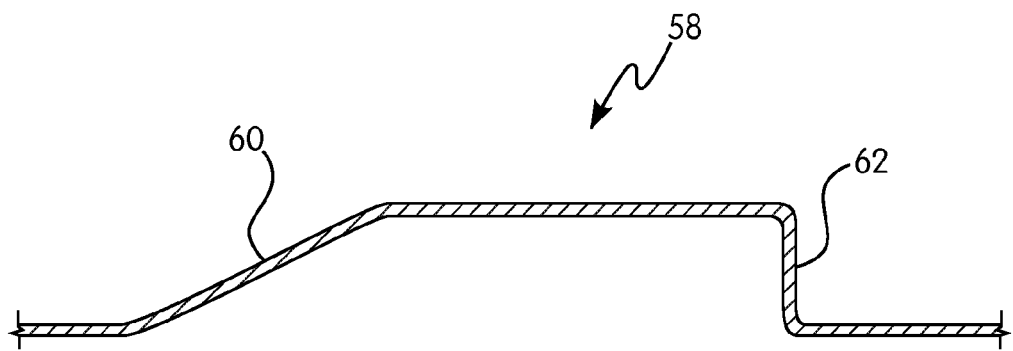
FIG. 5A is a partial cross-sectional view of a structure configured to inhibit a flow of grain on the top plate of FIG. 5 taken along section A-A.

Referring to FIGS. 5 and 5A, in accordance with an aspect of the present embodiment, the structure 58 is preferably configured as any elongated protrusion having a sloped anterior extent 60 and a substantially vertical posterior extent 62. The rearwardly extending portions or first and second portions 58a, 58b also include a vertical inner extent 62a, 62b. The sloped anterior extent 60 is preferably configured as a planar slope extending from the top surface of the top plate to a top surface of the structure. The vertical posterior extend and inner extents are configured to be vertically oriented surfaces as much as possible.

Preferably, the structure 58 has a height of about 5 mm to 7 mm, and more preferably about 6 mm. Alternatively, the structure 58 can be configured to have a maximum height sufficient to allow the paddles 40 of the gathering chain assembly 32 to freely pass over the structure 58 during operation or a height based on the typical size of a kernel of corn so as to be a sufficient height to prevent grain kernels from sliding forward. The structure 58 is also preferably configured to have a width of about 1 mm to 5 mm, but more preferably configured to have and overall with as small as possible.

Figure 5B:
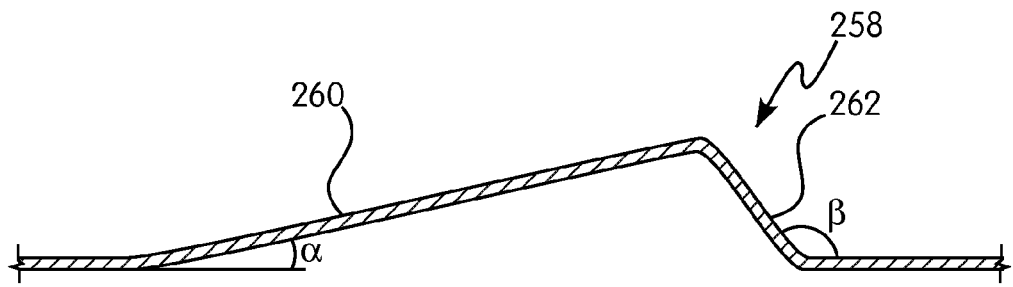
FIG. 5B is a partial cross-sectional view of a structure configured to inhibit a flow of grain on a top plate in accordance with another aspect of the present invention.
Figure 6:
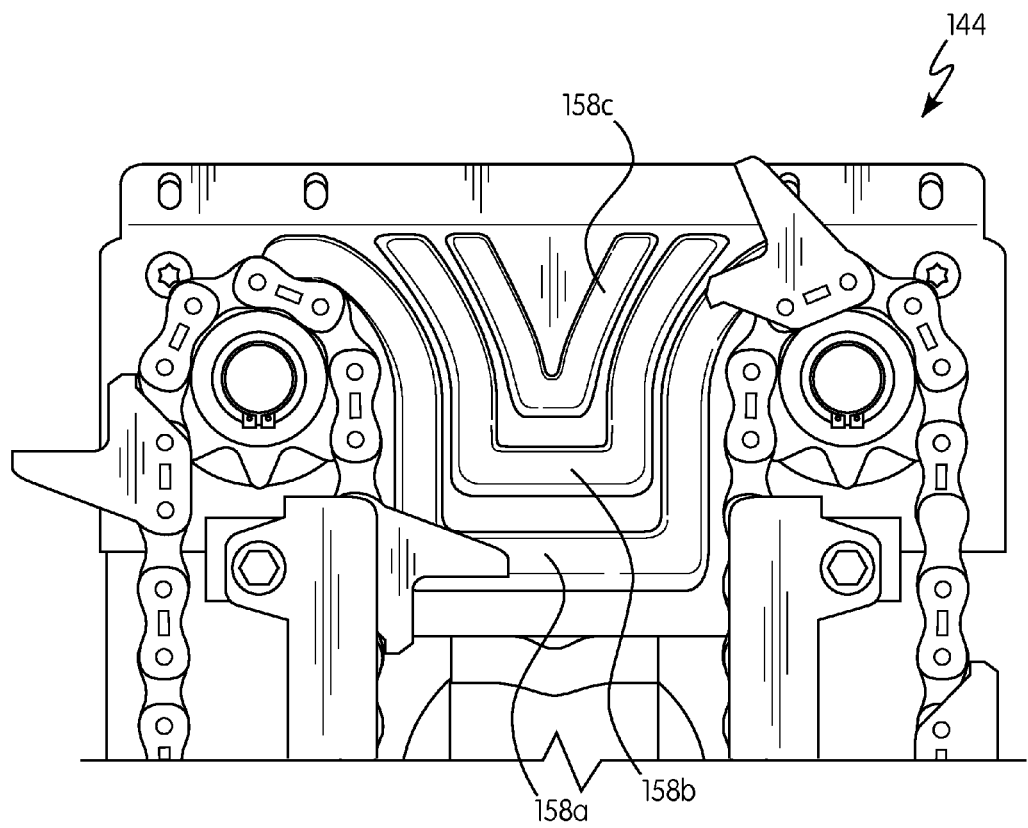
FIG. 6 is an enlarged partial top perspective view of a top plate of a row unit in accordance with another preferred embodiment of the present invention.

FIG. 5B illustrates an alternative cross-sectional configuration of a structure 258 in accordance with another aspect of the present invention. Structure 258 is similarly configured as structure 58, but with a sloped anterior extent 260 and a sloped posterior extend 262. The sloped anterior extent 260 has an acute angle α with respect to a top surface of the top plate, and the sloped posterior extend 262 has an obtuse angle β with the top surface of the top plate.

As best shown in FIG. 3, the first and second portions 58a, 58b i.e., the curved portions of the structure 58, are positioned along the top plate so as to be spaced from the chain 38 of the gathering chain assembly when assembled together on the row unit. The curved portions of the first and second portions 58a, 58b are configured to wrap around and hinder or block the flow grain from entering or engaging with an inner portion of the respective gathering chain assemblies.

The structures 58 can alternatively be any structure formed about the outer surface of the top plate capable of sufficiently inhibiting the flow of grain in a substantially forward direction which gets deposited on the top plate. Further, the structure can be configured to have a subtle or slightly sloped forward edge so as not to restrict the flow of grain and crop material across the top plate and into the auger trough.

In operation, during harvesting, rows of plants to be harvested are aligned and directed to the row units 14. As the combine harvester 1 moves across a row of crops, plants are guided towards the gap 42 by its dividers where ears of corn are then stripped from the stalks due to the deck plates 40a, 40b and operation of stalk rollers (not shown) which pull the stalk material in a downwardly direction. The stalks remain on the ground and the ears of corn move rearward and into the header frame 12. The conveyor 20 then moves the ears of corn to the center of the header frame 12 so as to be fed into the feederhouse 18. The configuration and operation of the intake arrangements are typical of standard combine harvesters.

During the stripping process, kernels of corn can be stripped from the ears and fall onto the row unit's top plate and then towards the ground. However, the top plate 44 of the present embodiments will now effectively prevent or inhibit the flow of grain falling on the top plate from being deposited on the ground. That is, loose grain which is distributed on the top plate will now be retained or inhibited from falling to the ground by the structure 58 and recoverable for transport to the conveyor 20 by the flow of subsequent crop material over the top plate as a result of the top plate preventing the loose grain from reaching the ground and being retained on the surface of the top plate.

The top plate of the present embodiments address the problems associated with loose grain falling on the top plate of each row unit 14. Specifically, the top plate inhibits or keeps grain from sliding forward and down towards the ground. As a result, loose grain is recoverable by the subsequent flow of crop material processed by the combine harvester 1.

In accordance with another aspect of the present invention, the top plate 144 is configured with a plurality of structures 158a, 158b, and 158c. Each of the plurality of structures are elongated structures and similarly configured as structure 58 described above. Each structure 158b, 158c is preferably configured in a nesting configuration or spaced configuration from structure 158a. The plurality of structures is configured to substantially span the exposed top surface of the top plate 144.

It will be appreciated by those skilled in the art that changes could be made to the embodiments described above without departing from the broad inventive concept thereof. For example, alternative components and designs of the structure on the top plate can be used. It is to be understood, therefore, that this invention is not limited to the particular preferred embodiments disclosed, but it is intended to cover modifications within the spirit and scope of the present invention as defined by the appended claims.

We claim:

1. A row unit of a corn head assembly, comprising:
   a frame;
   first and second spaced apart row unit arms mounted to the frame, each row unit arm having a forward end and a rear end, each said row unit arm includes a gathering chain assembly having a drive sprocket about the rear end, a driven sprocket about the forward end, and an endless chain extending between the drive and driven sprockets; and
   a top plate positioned about a rear end of the frame, the top plate including an outer surface having a structure configured to inhibit a flow of grain in a forward direction along the outer surface, wherein the structure includes a forward, linear portion extending parallel to and along a forward end of the top plate, and a pair of rearwardly extending, curved portions extending from the forward portion such that each said rearwardly extending curved portion extends along a path which corresponds to a respective travel path of said endless chains.

2. The row unit of claim 1, wherein the top plate extends across the rear end of the first and second row unit arms.

3. The row unit of claim 1, further comprising a pair of spaced apart deck plates mounted to the frame and positioned adjacent a forward end of the top plate, and wherein the structure is an elongated structure that extends along the forward end of the top plate.

4. The row unit of claim 1, wherein the structure is an elongated structure.

5. The row unit of claim 1, wherein the structure is configured as at least one of a corrugation, a rib and a protrusion.

6. The row unit of claim 1, wherein the top plate includes a plurality of structures.

7. The row unit of claim 1, wherein the structure includes a sloped anterior extent and a vertical posterior extent.

8. The row unit of claim 1, wherein the structure is mounted to the top plate.

9. The row unit of claim 1, wherein each row unit arm includes a gathering chain assembly having a drive sprocket about the rear end, a driven sprocket about the forward end, and an endless chain extending between the drive and driven sprockets, and wherein the structure is an elongated structure having: a curved first portion extending along a path adjacent a travel path of the endless chain of the first row unit arm, a curved second portion extending along a path adjacent a travel path of the endless chain of the second row unit arm; and a third portion extending along a forward end of the top plate.

* * * * *